United States Patent [19]

Nakai

[11] 3,752,277

[45] Aug. 14, 1973

[54] TORQUE CLUTCH MECHANISM IN AN AIR WRENCH

[76] Inventor: Sinji Nakai, No. 799 Kurotani, Yao, Osaka Prefecture, Japan

[22] Filed: Oct. 26, 1971

[21] Appl. No.: 192,228

[30] Foreign Application Priority Data

Mar. 13, 1971 Japan.............................. 46/16741
Mar. 13, 1971 Japan.............................. 46/16742
Mar. 13, 1971 Japan.............................. 46/16743
Mar. 13, 1971 Japan.............................. 46/16744
Oct. 27, 1970 Japan........................ 45/94951

[52] U.S. Cl.............. 192/56 R, 173/12, 192/.034, 192/44, 192/45
[51] Int. Cl. .... F16d 41/07, F16d 71/00, E21c 5/16
[58] Field of Search....................... 192/44, 45, 56 R

[56] References Cited
UNITED STATES PATENTS

| | | | |
|---|---|---|---|
| 2,889,022 | 6/1959 | Better et al. ...................... | 192/56 R |
| 2,391,350 | 12/1945 | Schmidt............................... | 192/45 |
| 2,683,362 | 7/1954 | Bowman ........................ | 192/56 R X |
| 2,989,160 | 6/1961 | Woodruff........................... | 192/44 X |
| 3,305,057 | 2/1967 | McAlpin et al.................... | 192/44 X |

FOREIGN PATENTS OR APPLICATIONS

| | | | |
|---|---|---|---|
| 594,141 | 3/1934 | Germany ............................... | 192/45 |
| 278,427 | 10/1927 | Great Britain........................ | 192/45 |

*Primary Examiner* — Allan D. Herrmann
*Attorney* — E. F. Wenderoth, V. M. Creedon et al.

[57] ABSTRACT

A torque clutch mechanism in an air wrench, comprising a torque clutch means capable of not only closing an air supply suspension valve by detecting an excess counterreactive force when such force is applied to the rotor shaft of said air wrench, but also reversing said rotor shaft.

4 Claims, 29 Drawing Figures

Patented Aug. 14, 1973  3,752,277
6 Sheets-Sheet 1
FIG. IA  FIG. IB  FIG. IC
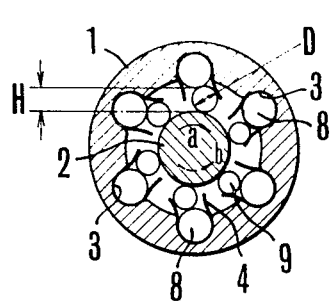
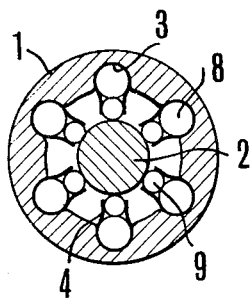
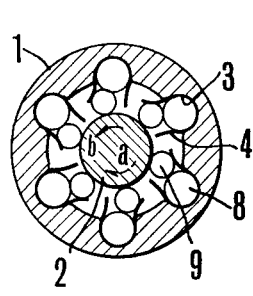
FIG. 2
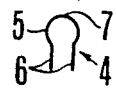
FIG. 3
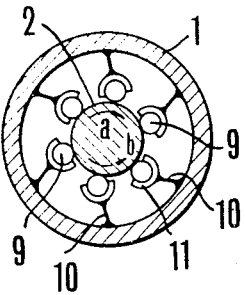
FIG. 5
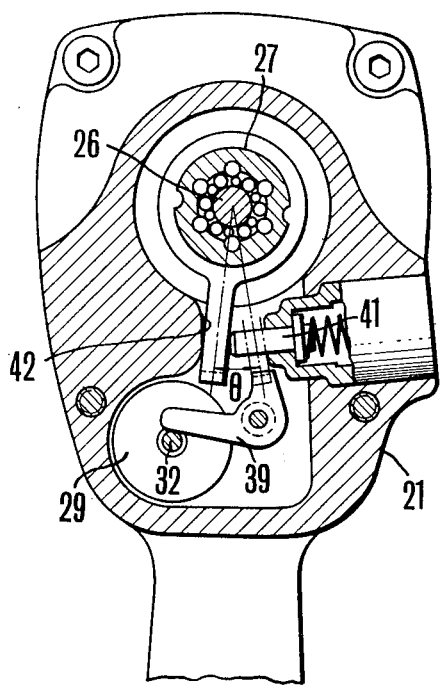

TORQUE CLUTCH MECHANISM IN AN AIR WRENCH

This invention relates to torque clutch mechanism in an air wrench, and more particularly to a torque clutch adapted to clutch the rotary shaft up to a predetermined small torque but to cause said rotary shaft to idle if said torque is exceeded when the direction of the rotation of the rotary shaft is altered.

Heretofore, torque clutches of this type have been of the construction as described in the specification of U.S. Pat. No. 3,305,057. As compared with those prior arts, the torque clutch mechanism according to this invention comprises a plurality of rotary rolls which are supported by spring means provided on the internal periphery of the clutch member, said rotary rolls being brought into contact with the external periphery of the rotary shaft between the clutch member and said rotary shaft positioned thereinside, said rotary rolls simply rotating supported by the spring means during the rotation of the rotary shaft, said rolls however being held up between the clutch member and the rotary shaft when the direction of the rotation is altered, thereby clutching both members, said rotary rolls being displaced when torque exceeding the predetermined small torque is applied, thereby causing the rotary shaft to idle. This invention therefore concerns a torque clutch mechanism applicable to an air wrench based upon the torque clutch as described hereinbefore.

This invention has for its object to provide a very conveniently operatable air wrench wherein, when excess counterforce is applied to the rotor shaft of the air wrench, the clutch member is adapted to be clutched to a detector shaft integrally formed with the rotor shaft, thereby rotating within the scope of a predetermined angle an operation lever provided on the clutch member, a lever activating an air supply suspension valve being operated during said reverse, thus enabling the rotor shaft to rotate reversely urged by a counterforce greater than the predetermined torque acting upon the clutch in the state of said rotation within the scope of the predetermined angle, as a result of which the excess counterforce detector member is not only free from the risk of burning but capable of suspending the air supply in response to an excess counterforce, moreover the original state being restorable by the release of a throttle lever.

These and other objects are accomplished by the parts, improvements, combinations and arrangements comprising the invention, preferred embodiments of which are shown by way of example in the accompanying drawings, and herein described in detail.

Various modifications and changes in details of construction are comprehended within the scope of the appended claims.

This invention concerns an air wrench to which is applied a torque clutch mechanism wherein, between a clutch member and a rotary shaft positioned thereinside, a plurality of movable rolls supported by spring members provided on the internal periphery of the clutch member are brought into contact with the external periphery of the rotary shaft, the movable rolls simply rotating supported by the spring members during the rotation of the rotary shaft, however in the case of reverse rotation said rolls being held up between the clutch member and the rotary shaft thereby clutching both members, the movable rolls being displaced when torque greater than the predetermined value is applied, thereby allowing the movable rolls to idle.

In the figures:

FIGS. 1A–1C show sectional views of the torque clutch applicable to the air wrench of this invention.

FIG. 2 is a descriptive figure of the spring member shown in FIG. 1.

FIG. 3 is a sectional view showing a modification of FIG. 1.

FIG. 5 is a sectional view taken on the line V—V in FIG. 4.

Figure 4:
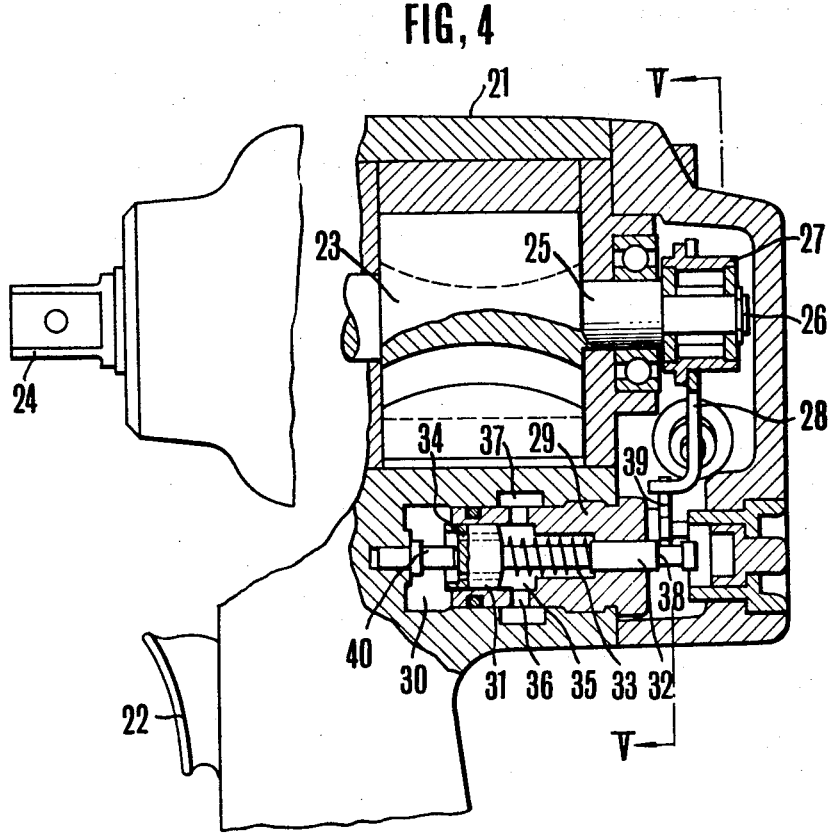
FIG. 4 shows a lateral view of an air wrench to which is applied the torque clutch as designated in FIG. 1, of which a part is omitted and broken away.

The fundamental construction of the torque clutch in the air wrench according to the invention is as shown in FIGS. 1 to 3, in which the numeral 1 designates a clutch member, 2 designating a rotary shaft, clutching action being effected between these two members within the predetermined torque at the time of shift of rotation of the rotary shaft 2. As shown in FIG. 1, grooves 3 are provided in several locations (at least more than three locations) on the internal surface of the clutch member 1, spring members 4 being fitted into said groooves 3, each of said spring members 4 being formed into a stationary roll receiving section 5, a movable roll 9 being interposed between the stationary roll 8 and the rotary shaft 2, said roll 9 being prevented from dislocation by means of the pressure element 6, the spring member 4 being prevented from rotating relative to the clutch member 1 by means of the rotation prevention section 7. Now, the movable rolls 9 have a diameter D which is $H+\gamma(\gamma=\text{max-imum}-\text{minimum})$, H representing the shortest distance between the external periphery of the rotary shaft 2 and that of the stationary roll 8, so that the movable rolls will not pass freely between said shortest distance H. Accordingly, in order that the rotary shaft 2 may alter the direction of its rotation relative to the clutch member, for instance from A to B, C or from C to B,A in FIG.1, it is necessary that torque which is greater than the predetermined small torque should be applied.

To be more precise, in the state of idling in the clockwise direction of rotation (a) in FIG.1, A. The movable roll 9 is free though pressed by the pressure element 6 owing to the rotation of the rotary shaft 2. However, in case the rotation is altered into counterclockwise rotation (b), if the torque forcing the rotary shaft 2 to rotate in said direction (b) is small, the rotary shaft 2 is clutched to the clutch member 1 by the friction between said rotary shaft 2, movable rolls 9 and stationary rolls 8, and the additional force of the pressure element 6 of the spring members 4.

Then, according as the torque of counterclockwise rotation (b) of the rotary shaft 2 increases, the movable rolls 9 are compressed or the rotary shaft 2 and the stationary rolls 8 are separated from each other, thus the diameter D of the movable rolls 9 becoming the same as or less than the clearance H, as a result of which said movable rolls 9 are set free by shifting to the positions of FIG. 1C through the positions of FIG. 1B, thus the rotary shaft 2 idles in counterclockwise rotation (b) relative to the clutch member 1. This is also the case with the rotary conversion from counterclockwise rotation (b) to clockwise rotation (a).

FIG.3 shows that a spring member 10 integrally secured to the inside of the clutch member 1 is provided as a substitute for the spring members 4 in FIG. 1, movable roll receiving sections 11 being provided at the front end thereof, movable rolls 9' being fitted into the receiving sections 11.

Each movable roll 9' is constantly brought into contact with the external periphery of the rotary shaft 2, the spring member 10 constantly urging the roll 9' toward the axis, said movable roll 9' also performing the same action as the aforementioned roll 9 does, with the result that, for the rotary shaft 2 to alter its rotation counterclockwise from its clockwise (a) idling, it is necessary that the rotary shaft 2 should be once clutched and then torque that is greater than the predetermined small torque should be applied thereto. This is also the case with the reverse thereof.

As described hereinbefore, the clutch shown in FIGS.1 to 3, in the case of rotary conversion, clutches the rotary shaft 2 to the clutch member 1 within the predetermined small torque. Then, if the clutch member 1 is secured, the rotary torque in the rotary shaft 2 is infinite, and therefore said small torque applied to the clutch member 1 at the time of rotary conversion of the rotary shaft 2 is momentary. However, if the clutch member 1 is adapted to be rotatable within the scope of a predetermined angle, only a small torque sufficient to rotate the clutch member 1 within said scope is applied at the time of rotary conversion, the clutch member 1 being thus arrested after rotating through the predetermined angle, resulting in that the rotary shaft 2 idles as described hereinbefore.

Consequently, if the clutch is so provided that, for instance, it allows the clutch member to rotate within the scope of a predetermined angle, in the case of rotary conversion of the rotary shaft under influence of a counterforce applied thereto, said rotary shaft and clutch member are temporarily clutched, however the clutch member being capable of rotating within the scope of a predetermined angle, and therefore detection of the rotation within said scope enables one to detect the rotary conversion of the rotary shaft. Since the driving source of the rotary shaft can be cut off by the detection signal, said rotary shaft and the like are protected from damage. Moreover, the scope of application is very extensive because this device is applicable to both clockwise and counterclockwise rotation.

As described hereinbefore, this invention provides a torque clutch mechanism in an air wrench as shown in FIGS.4 and 5 by the application of a torque clutch as illustrated in FIGS.1 to 3.

Referring to FIGS.4 to 7, the numeral 21 designates an air wrench member, a rotor 23 being rotated by supplying air by the operation of a throttle lever 22, thereby rotating an anvil 24 positioned at the front end of the wrench member 21. At the rear end of the rotary shaft 25 of the rotor 23 is integrally formed an excess counterforce detector shaft 26, a torque clutch mechanism 27 having a clutch member 27 built in on the external periphery of the detector shaft 26 centering thereon, the clutch member 27 being so adapted as to be capable of rotating within the scope of angle θ by providing an operation lever 28 on said clutch member 27. The numeral 29 designates an air supply suspension valve member, said member 29 being capable of intercepting the supply of air which is fed to a chamber 20 by the operation of the throttle lever 22 before said air reaches the chamber of the rotor 23 interposed between a valve and a valvemember 29 facing the chamber 30. In the ordinary state as shown in FIG.4, air reaches an inner chamber 35 from the chamber 30 through a hole 34 provided in the valve 31, said air further being fed to the chamber of the rotor 23 by way of a passage 31 through a hole 36 provided in the valve member 29.

A lever arrester member 38 for arresting a lever 39 is formed at the front end of the valve shaft 32, said member 38 being capable of preventing the valve 31 and the valve shaft 32 from being displaced by the air pressure from the chamber 30. The numeral 40 designates a pin for controlling said valve 31 so as not to be pushed out more than necessary by the spring 33 when the air pressure no longer exists in the chamber 30. The numeral 41 designates a pin for determining the normal position of the operation lever 28, said operation lever 28 being normally brought into contact with a wall 42 formed on the wrench member 21 by the pressure of said pin 41.

The torque clutch mechanism consisting of the aforementioned clutch member 27 comprises movable rolls 44 interposed between stationary rolls 43 fitted into the internal periphery of the clutch member 27 and the detector shaft 26, said movable rolls 44 having a slightly greater diameter than the smallest clearance between said stationary rolls 43 and the detector shaft 26, and spring members 45 constantly urging said movable rolls 44 into contact with the stationary rolls 43 and the detector shaft 26 without allowing said movable rolls 44 to play, so that, when the detector shaft 26 shifts its rotation under the influence of a counterforce applied to the rotor shaft 25 through the anvil 24, the clutch member is clutched to the detector shaft 26 through said movable rolls 44. Three embodiments of the predetermined torque clutch are shown in FIGS. 6A–6C.

Figure 6A:
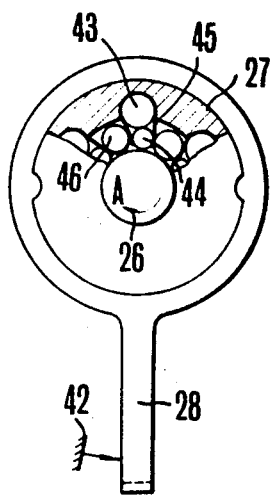
FIGS. 6A–6C are descriptive figures showing an embodiment of the torque clutch for excess counterforce detection.
Figure 6B:
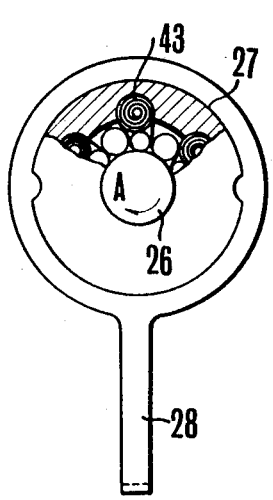
Figure 6C:
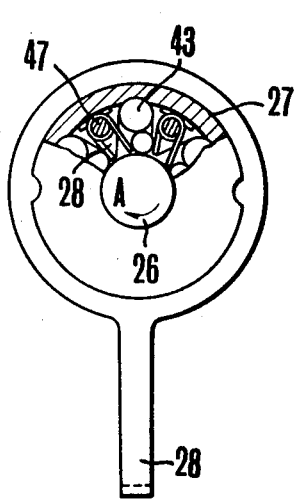

The numeral 46 in FIGS. 6A and 6B designates an auxiliary roll which is interposed between the detector shaft 26 and the clutch member and also between movable rolls 44, thereby serving to stabilize the clutching action. In FIG. 6B the stationary rolls 43 are resilient rolls consisting of a helical plate spring or the like. Furthermore, in FIGS. 6C the spring members 45 consist of twisted coil springs, a pin 47 being provided to support each spring, a projection element being formed on which to provide said pin 47.

Figures 7A, 7B, 7C:
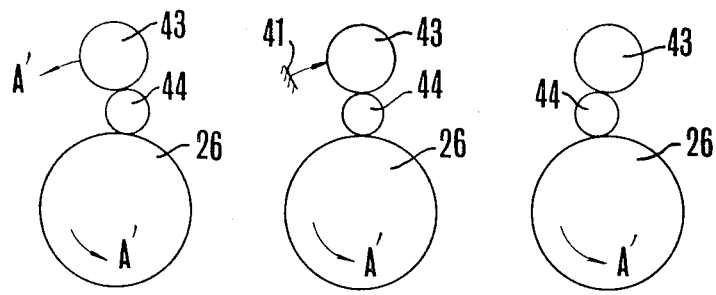
FIGS. 7A–7C are descriptive figures showing the clutching action at the time of excessive counterforce detection.

Hereunder is explained the action when excess counterforce is applied to the anvil 24 of the air wrench. This air wrench 21 conducts an intermittent screwing action by means of the anvil 24, and supposing that the rotor shaft 25 is rotating clockwise A, a counterforce against the rotation of the rotor 23 becomes greater with the progress of the screwing operation, a force to reverse the rotor shaft 25 increasing as a result. Now, if the rotor shaft 25 is reversed by said counterforce, the clutch performs an action as described hereunder. In a state wherein the detector shaft 26 rotates clockwise A relative to the rotor shaft 25, the movable rolls 44 are rolled by the detector shaft 26 while being supported and forced into contact with the stationary rolls 43 by the spring members 45, the clutch member 27 being arrested by the counterforce, the operation lever 28 being brought into contact with the wall 42. However, if the rotation of the rotor shaft 25 is reversed, the detector shaft is also rotated counterclockwise A', consequently the movable rolls 44 that have been rolling while being held between the detector shaft 26 and the stationary rolls 43 as shown in FIG.7, A, the friction arising therefrom resulting in transmitting the reversal of the detector shaft 26 to the clutch member 27 through the stationary rolls 43, thereby causing the clutch member 27 to rotate counterclockwise A', the operation lever 28 being also rotated as a result. This rotation however is terminated by the operation lever 28 which is brought into contact with the pin 41 after rotating through the angle $\theta$. To be more precise, by the contact of the operation lever 28 with the pin 41, the great counterforce acts upon the stationary rolls 43 through the member 27, great torque acting upon the stationary rolls 43 from the detector shaft 6, consequently friction of the movable rolls 44 against the detector shaft 26 and the stationary rolls 43 is maximized, the mutual compression and deformation resulting in the state as shown in FIGS. 7B. Therefore, the rotor shaft 25 is reversed in response to the excess counterforce acting upon the anvil 24, simultaneously the lever 39 being knocked by the operation lever 28 when said operation lever 28 has rotated through the angle $\theta$, consequently the valve 31 which is disengaged from the arresting section 38 of the valve shaft 32 being pushed by the air pressure of the chamber 30 in resistance to the spring 33, thus stopping the air supply from the chamber 30 to the chamber of the rotor 23 by blocking the hole 36 with the external periphery of said valve 31. Then, since the air pressure to the chamber 30 is removed by releasing the throttle lever 22, the valve 31 is restored by the pressure of the spring 33, the operation lever 28 is also restored by the pressure of the pin 41, the lever 39 being engaged with the arresting section 38 of the valve shaft 32, thus the entire mechanism being restored to its original state.

As described hereinbefore, the air wrench of this invention is so devised that, when excess counterforce is applied to the rotor shaft, the clutch member is clutched to the detector shaft integrally formed on the rotor shaft, the operation lever provided on the clutch member being rotated through a predetermined angle, the lever for activating the air supply suspension valve being operated during the reverse, a counterforce exceeding the predetermined torque acting upon the clutch in the state after the rotation through the predetermined angle, thereby enabling the rotor shaft to reverse.

Therefore, this invention makes it possible to suspend the supply of air during excess counterforce without the risk of burning the excess counterforce detector member unlike in the case of the known system. Moreover, since the entire mechanism is restored to its original state by the operation of the throttle lever, this invention is capable of simplifying the handling to a great extent.

The torque clutches illustrated in FIGS.8 to 17 each have embodiments of a different type wherein, when excess counterforce is applied to the rotary shaft of the air wrench or the like, or in the case of rotary conversion, the rotary shaft is clutched until the torque reaches a predetermined value but said shaft idles when the torque exceeds said predetermined value.

Referring to FIGS.8 to 10C, the numeral 51 designates a clutch member, 52 designating a rotary shaft connected to the rotary shaft of the air wrench or the like, clutching between said members being effected within the scope of a predetermined small torque at the time of the conversion of the rotary shaft 52. Grooves 53 are formed at a plurality of locations on the internal periphery of the clutch member 51, stationary rolls 55 being fitted into the grooves 53 with spring members 54 interposed therebetween. A main roll 56 for clutching action is interposed between each of the stationary rolls 55 and the rotary rolls 52, the spring members 54 being provided so that the rolls 56 are not allowed to idle but are constantly brought into contact with the rotary shaft 52 and the stationary rolls55. Now, between the minimum clearance H from the rotary shaft 52 to each stationary roll 55 (see FIG.10, A) and the diameter D of the main roll 55 there exists a relation of H<D, that is, D is slightly larger then H.

Furthermore, auxilliary rolls 57 for operating the clutch are rotatably interposed between the clutch member 51 and the rotary shaft 52, more particularly between the parts having no rolls 56, that is between adjacent rolls 56. The numeral 58 designates an operation lever mounted on the clutch member 1 secured in the direction of rotation, said lever 58 being caused to rotate simultaneously with the clutch member 51 so as to perform the predetermined action when the clutch member 51 is clutched to the rotary shaft 52 at the time of conversion thereof (that is, when excess counterforce is applied in the case of the air wrench).

Figure 8:
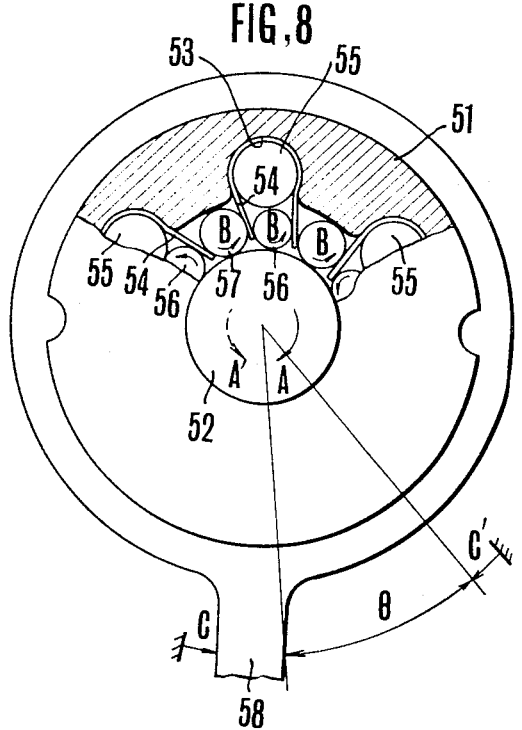
FIG. 8 is a sectional view showing another embodiment of the torque clutch, of which a part is omitted.
Figure 9:
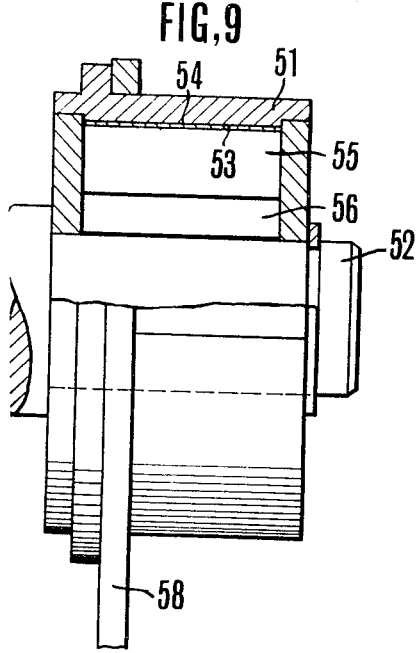
FIG. 9 is a lateral view of the torque clutch shown in FIG. 8, of which a part is omitted.
Figures 10A, 10B, 10C:
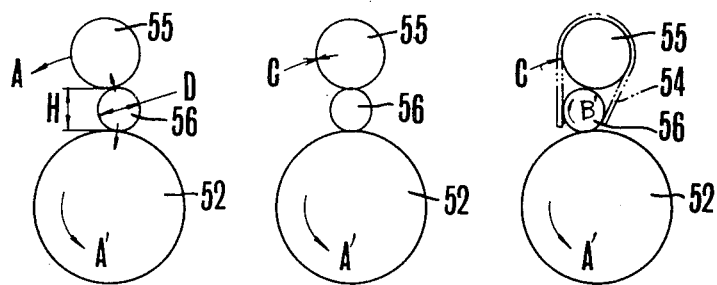
FIGS. 10A–10C are descriptive figures showing the clutching action at the time of shift of rotation of the torque clutch shown in FIG. 8.
Figure 11:
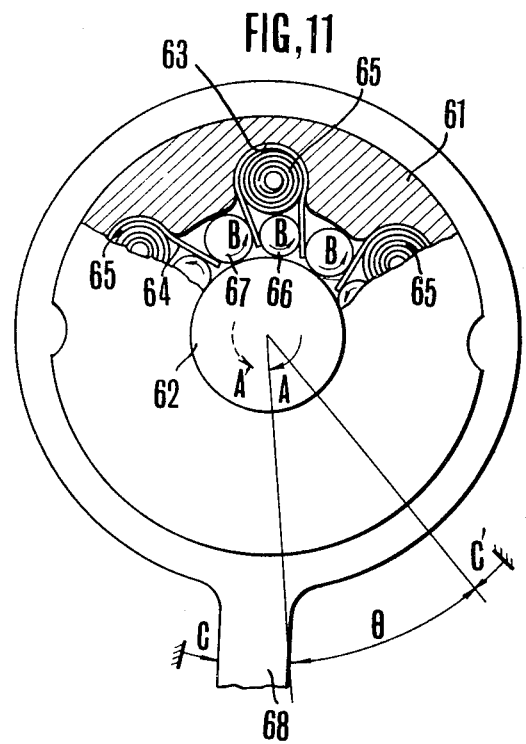
FIG. 11 is a sectional view showing still another embodiment of the torque clutch, of which a part is omitted.
Figure 12:
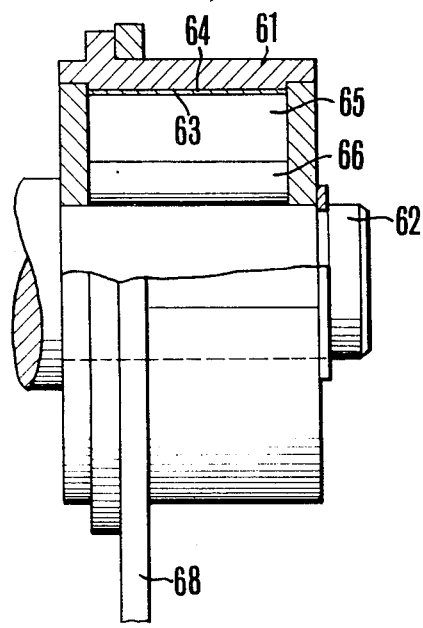
FIG. 12 is a lateral view of the torque clutch shown in FIG. 11, of which a part is omitted.

In the construction as described hereinbefore, the clutching operation is conducted as explained hereunder. Supposing that the rotary shaft 52 rotates in the arrow-indicated direction A shown in FIG.8, the main rolls 56 for the clutching operation are rotated in the arrow-indicated direction B by the rotary shaft 52, said main rolls 55 being brought into contact with the stationary rolls 55 by the spring members, the auxilliary rolls 57 being rotated simultaneously in the arrow-indicated direction B. In the meantime, the clutch member 51 is halted under the influence of counterforce C, the operation lever 58 being brought into contact with the suitable portion of the apparatus forming part of the clutch. And supposing that in the aforementioned state the rotation of the rotary shaft 52 is converted by an excess counterforce applied to the rotary shaft 52 or some other influence, that is, if the rotary shaft 52 shifts its rotation in the arrow-indicated direction A', the clutch member 51 is temporarily clutched to the rotary shaft 52 within the scope of the predetermined torque as explained hereinunder. That is, in the case of rotary conversion from the state as shown in FIG.8, since the clutch member 51 (i.e., the operation lever 58) is adapted to be free from counterforce in the direction of A', the clutch operation main rolls 56 are held up between the rotary shaft 52 and the stationary rolls 55 as illustrated in FIG.10, A, the friction resulting therefrom transmitting the rotation of the rotary shaft 52 to the clutch member 51 through the stationary rolls 55, thereby causing the clutch member 51 to rotate in the direction A'. The torque needed for the rotation of the clutch member is obtained from the friction of the main rolls 56 against the rotary shaft 52 and the stationary rolls 55. And when the clutch member 51 is rotated through the angle $\theta$ and counterforce C' is applied to the operation lever 58 (i.e., the state wherein the operation lever 58 is brought into contact with a stopper provided at a suitable position), the stationary rolls 55 are subjected to the great counterforce C' so that said stationary rolls 55 are forced to transmit said great torque, as a result of which the friction of the main rolls 56 against the rotary shaft 52 and the stationary rolls 55 is maximized, thereby causing transition to the state illustrated in FIG.8 (C) through the state of FIG.8 (B). Since the main rolls 56 are urged by the spring members 54, said rolls 56 are brought into contact in the reverse direction and rotated in the direction B' without being separated from the rotary shaft 52 and the stationary rolls 55. At the same time, the auxilliary rolls also rotate in the direction B', though not shown in the drawing.

As explained hereinbefore, the clutch of this embodiment is a torque clutch adapted to clutch by small torque which is sufficient to rotate the clutch member at the time of the rotary conversion of the rotary shaft, the clutch being released when the clutch member is arrested and great torque is applied by the action of great counterforce. Therefore, if the clutch member is adapted to be capable of rotating through a predetermined angle by providing an operation lever on said clutch member, when the rotary shaft shifts its rotation under the influence of excess counterforce, the clutch member is clutched to the rotary shaft and rotated through the predetermined angle. Therefore, the change in rotation of the rotary shaft is detectable by a limit switch or the like. Consequently, in the case of the air wrench, the air supply interception valve thereof is controllable, thereby protecting the rotary shaft and the like. Moreover, between the clutch member and the rotary shaft auxilliary rolls are interposed between main rolls, and therefore in the case of displacement of each main roll at the time of the clutching operation, said roll is simultaneously displaced guided by the auxilliary rolls, making it possible to stabilize the clutching operation to a great extent.

In addition thereto, the clutch according to this embodiment, when applied to clockwise and counterclockwise rotary machines, makes it possible to detect the rotary conversion by temporarily clutching the rotary shaft at the time of the conversion.

The torque clutch illustrated in FIGS.11 to 13C shows still another embodiment. Referring to the drawings, the numeral 61 designates a clutch member, 62 designating a rotary shaft connected to a rotor shaft of an air wrench or the like, clutching operation being effected within the scope of a predetermined small torque between both said members at the time of rotary conversion of the rotary shaft 62. On the internal periphery of the clutch member 61 are formed grooves 63 at a plurality of locations thereof, resilient rolls 65, such as helical plate springs, being fitted into said grooves through spring members 64. Between the resilient rolls 65 and the rotary shaft 62 clutch operation main rolls 66 are interposed, the rolls 66 being urged by the spring members 64 so that said rolls 66 may be constantly brought into contact with the rotary shaft 62 and the resilient rolls 65 without idling. Now between the minimum clearance H from the rotary shaft 62 to the resilient rolls 65 (see FIG.13, A) and the diameter D of the main rolls 66, there exists a relation of H<D, that is, D is slightly greater than H. Between the clutch member and the rotary shaft 62 clutch operation auxilliary rolls 67 are rotatably interposed at the places having no rolls 66, i.e., between the rolls 66. The numeral 68 designates an operation lever mounted on the clutch member 61 with a fixed rotary direction, said lever 68 being rotated simultaneously with the clutch member 61 for conducting the predetermined action at the time of the rotary conversion of the rotary shaft 62 (i.e., when excess counterforce is applied in the case of an air wrench).

Figure 13A:
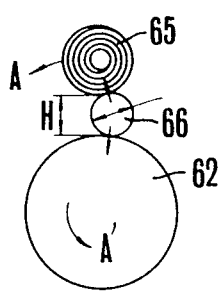
FIGS. 13A–13C are descriptive figures showing the clutching action at the time of shift of rotation of the torque clutch designated in FIG. 11.
Figure 13B:
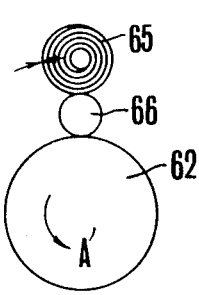
Figure 13C:
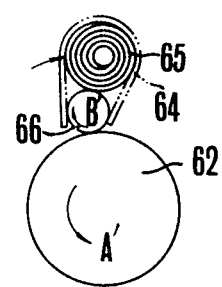
Figure 14:
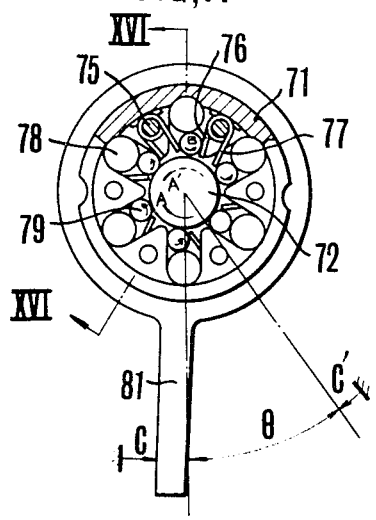
FIG. 14 is a sectional view showing still another embodiment of the torque clutch, of which a part is omitted.
Figure 15:
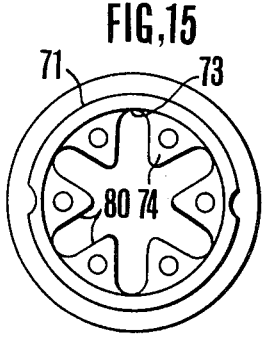
FIG. 15 is an elevation showing the clutch member in FIG. 14.
Figure 16:
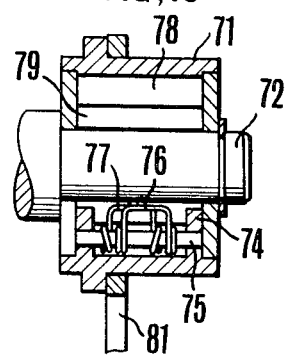
FIG. 16 is a sectional view taken on the line XVI—XVI in FIG. 14.

Hereunder is explained the clutching action in the aforementioned construction. Supposing that the rotary shaft 62 is rotating in the direction A shown in FIG.11, the clutch operation main rolls 66 are rotated by the rotary shaft 62 in the arrow-indicated direction B while being urged by the springs 64 and brought into contact with the surface of the resilient rolls 65, simultaneously the auxiliary rolls 67 being likewise rotated in the arrow-indicated direction B. At this instant, the clutch member 61 is halted by counterforce C, the operation lever 68 being brought into contact with a suitable part of the apparatus on which the clutch is provided. And supposing that the rotary shaft 62 shifts its rotation owing to the action of a counterforce or the like, that is, the rotary shaft 62 shifts its rotation to the arrow-indicated direction A', the clutch member 1 is temporarily clutched to said rotary shaft 62 within the scope of a predetermined torque in a manner as described hereunder. That is, in case the conversion is effected from the state of rotation in the direction A in FIG.11, since the clutch member 61 (namely, the operation lever 68) is so adapted as to be free from counterforce in the direction A', the clutch operation main rolls 66 are held between the rotary shaft 62 and the resilient rolls 65 as illustrated in FIG.13, A, by the friction resulting therefrom the rotation of the rotary shaft 62 being transmitted to the clutch member 61 through the resilient rolls 65, thereby rotating the clutch member 61 in the direction A'. The torque needed for the rotation of the clutch member 61 is obtained from the friction of the main rolls 66 against the rotary shaft 62 and the resilient rolls 65, and the torque is not so great that it will compress the resilient rolls 65. And when the clutch member 61 is rotated through the angle $\theta$ and the operation lever 68 is subjected to counterforce C' (i.e., in the state wherein the operation lever 68 is brought into contact with a stopper provided at a suitable position), the great counterforce C' acts upon the resilient rolls 65, thereby bringing the clutch member to a halt, great torque acting upon the resilient rolls 65 from the rotary shaft 62, thus the friction of the main rolls 66 against the rotary shaft 62 and the resilient rolls 65 being maximized, thereby compressing and distorting the resilient rolls 65, resulting in transition from the state of FIG.13 (B) to the state of FIG.13 (C). In the meantime, since the main rolls 66 are urged by the spring member 64, said rolls 66 are reversely compressed without separating from the rotary shaft 62 and the resilient rolls 65, thereby effecting rotation in the direction B'. Simultaneously, the auxilliary rolls 67 also rotate in the direction B', though not shown in the drawings.

As explained hereinbefore, the clutch of this embodiment is a predetermined torque clutch in which clutching is effected by a small torque that is sufficient to rotate the clutch member at the time of the rotary conversion of the rotary shaft, great torque resulting from the action of great counterforce arising from stoppage of the clutch member, with the result that the clutched state is released, thereby allowing the rotary shaft to idle. Consequently, if the clutch member is adapted to be rotatable through a predetermined angle by providing an operation lever or the like on said clutch member, said clutch member clutched to the rotary shaft rotates through the predetermined angle when the rotation of the rotary shaft is converted by excess counterforce applied thereto, and therefore the rotary conversion is detectable by a limit switch or the like. In the case of air wrenches, the air supply suspension valve is controllable, thereby protecting the rotor shaft and the like from damage.

Furthermore, stabilized clutching action is obtainable through the mutual intervention between the main rolls by interposing auxilliary rolls therebetween, and moreover resilience of the stationary rolls fitted into the clutch member makes it possible to obtain the effects as stated hereunder. That is, for instance, said resilience and the fact that the diameter D of the main rolls is appropriately modified in relation to the clearance H makes it possible to set the maximum value of the predetermined torque freely and furthermore its compressed distortion makes it possible to ensure the clutching action with greater precision. In addition thereto, repetition of the compressed distortion is practicable for a long period of time, thereby ensuring a long life of the apparatus. Needless to mention, the clutch of this embodiment, when applied to the rotary shaft of clockwise and counterclockwise rotary apparatus, makes it possible to detect the rotary conversion by temporarily clutching the shaft at the time of the conversion.

The torque clutch illustrated in FIGS.14 to 17C shows still another embodiment.

Referring to the drawings, the numeral 71 designates a clutch member, 72 designating a rotary shaft connected to a rotor shaft of an air wrench or the like, clutching action being effected between these two members within the scope of predetermined small torque at the time of rotary conversion of said rotary shaft 72. On the internal periphery of the clutch member 71 are provided a plurality of projection elements 74 that form grooves 73 for fitting a plurality of stationary rolls thereinto, said projection elements 74 being adapted to support pins 75, twisted coil springs 76,77 being fitted to said pins 75.

Between each stationary roll 78 fitted into the groove 73 and the external periphery of the rotary shaft 72 is interposed a movable roll 79, said roll 79 being urged by legs depending from the coils of the springs 76,77 so as to be constantly brought into contact with the rotary shaft 72 and the stationary roll without idling. Furthermore, between the minimum clearance H from the rotary shaft 72 and the stationary roll 78 (see FIG. 17(A)) and the diameter D of the movable roll 79, there exists the relation of H<D, i.e., D being slightly greater than H. The movable roll 79 is brought into contact with the lateral parts of the projection element 74 that form the groove 73 so that, at the time of conversion of the rotary shaft 72 which is described hereinafter, said movable roll 79 will not be roteted more than necessary and separated from the stationary roll 78. The numeral 81 designates an operation lever mounted on the clutch member in the direction of its rotation, said lever 81 being rotated simultaneously with the clutch member 71 to perform the predetermined action, when said clutch member 71 is clutched to the rotary shaft 72 at the time of the rotary conversion thereof (when excess counterforce is applied in the case of an air wrench).

Figure 17A:
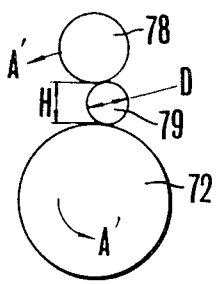
FIGS. 17A–17C are descriptive figures showing the clutching action at the time of shift of rotation of the torque clutch designated in FIG. 14.
Figure 17B:
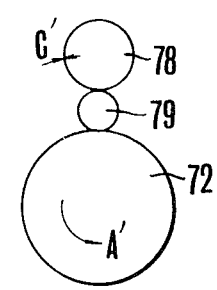
Figure 17C:
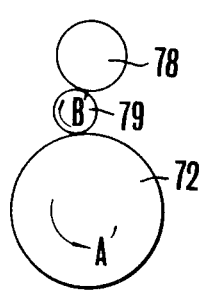

In the aforementioned construction, the clutching action is explained hereunder. That is, supposing that the rotary shaft 72 is rotating in the direction A shown in FIG. 1, the movable rolls 79 rotate in the arrow-indicated direction B while being urged by the springs 76 and brought into contact with the stationary rolls 78. At this instant, the clutch member 71 is brought to a halt by a counterforce resulting from contact of the operation lever 81 with a suitable part of the apparatus provided with this clutch. And supposing that the rotary shaft 72 is subjected to excess counterforce or the like and shifts its rotation, that is, the rotation of the rotary shaft 72 is converted to the arrow-indicated direction A', the clutch member 71 is temporarily clutched to the rotary shaft 72 within the scope of a predetermined torque in a manner as described hereunder. That is, in the case of conversion from the rotation in the direction A shown in FIG.14, since the clutch member 71 (i.e., the operation lever 81) is so adapted as to be free from counterforce in the direction A', the rotary rolls 79 are held between the rotary shaft 72 and the stationary roll 28 as illustrated in FIG. 17, A, the rotation of the rotary shaft 72 being transmitted by the friction to the clutch member 71 through the stationary rolls 78, thereby rotating the clutch member 71 in the direction A'. The torque needed for the rotation of the clutch member 71 is easily obtainable from the friction of the movable rolls 79 against the rotary shaft 72 and the stationary rolls 78. The clutch member 71 is rotated through the angle θ, thus counterforce C' acting upon the operation lever 81 (i.e., the state wherein the operation lever 81 is brought into contact with a stopper provided at a suitable place), as a result of which the clutch member 71 is brought to a halt by the great counterforce C' acting upon the stationary rolls 78, the friction of the movable rolls against the rotary shaft 72 and stationary rolls 78 being consequently maximized, thus transition to the state shown in FIG.17 (C) from that shown in FIG.17 (B) being realized. In the meantime, since the movable rolls are supported by the springs 77 and brought into contact with the lateral part 80 of the projection element 74, said movable rolls are brought into contact with reverse side by said springs 77 without being separated from the rotary shaft 72 and the stationary rolls 78, thus said movable rolls being rotated in the direction B' in accordance with the rotation of the rotary shaft 72 in the direction A'.

As explained hereinbefore, the clutch of this embodiment is a predetermined torque clutch wherein clutching is effected by a small torque that is sufficient to rotate the clutch member at the time of rotary converson of the rotary shaft, so that the clutch is released to allow the rotary shaft to idle when the clutch member is arrested and great counterforce arises. Consequently, if the clutch member is capable of rotating through a predetermined angle by providing an operation lever or the like on said clutch member, said clutch member rotates through said predetermined angle clutched by the rotary shaft when the rotation of the rotary shaft is converted by excess counterforce acting thereupon, thereby making it possible to detect the rotary conversion of the rotary shaft making use of a limit switch or the like. In the case of the air wrench, the air supply suspension valve is controllable, thereby making it possible to protect the rotor shaft and the like. Moreover, since a twisted coil spring is employed to support the movable roll so that it does not idle, the action of the spring upon the movable roll is ensured. Moreover, the spring is not only fit for repeated use for a long period of time but also capbale of being formed in a greater size. In addition thereto, since the movable roll is adapted to be brought into contact with and supported by the lateral part of the projection element that forms a groove for receiving the stationary roll, the movable roll is free from the risk of being rotated more than necessary at the time of rotary conversion, thereby making it possible to stabilize the clutching action. It goes without saying that the clutch of this embodiment, when applied to the rotary shaft of a clockwise and counterclockwise rotary apparatus, makes it possible to detect the conversion by means of temporarily clutching at the time of the conversion.

As stated hereinbefore, this invention concerns an air wrench to which a torque clutch is applied, it being adapted to prevent an excess counterforce detector member from the risk of burning, and making it possible to suspend the air supply at the time of excess counterforce, and moreover making it possible to restore the entire mechanism to its original state by the releasing operation of the throttle lever. In addition to the aforementioned advantages, the air wrench of this invention excels in that it is extremely easy to handle.

I claim:

1. A torque clutch for an air wrench, comprising an annular clutch member, a rotary shaft positioned within said annular clutch member with a space between the annular shaft and the clutch member, a plurality of stationary rolls mounted at intervals around the internal periphery of said annular clutch member, a plurality of spring members mounted around the internal periphery of said annular clutch member at positions adjacent said stationary rolls, a plurality of main movable rolls equal in number to the number of stationary rolls and having a diameter slightly larger than the clearance between the stationary rolls and the external periphery of said shaft, said main movable rolls being held against said rotary shaft and said stationary rolls by said spring means and being rotatably supported in said positions, whereby a predetermined torque between said shaft and said clutch member forces said main movable rolls against said rotary shaft and said stationary rolls for clutching said shaft and clutch member together, and a torque larger than said predetermined torque forces said main movable rollers past said stationary rolls and said shaft runs freely within said main movable rolls.

2. A torque clutch as claimed in claim 1 further comprising clutch operation auxiliary rolls rotatably positioned between said annular clutch member and said rotary shaft and between adjacent main movable rolls for stabilizing clutch action.

3. A torque clutch as claimed in claim 1 in which said stationary rolls are resilient rolls and said clutch member has recesses in the internal periphery thereof in which said resilient rolls are mounted.

4. A torque clutch as claimed in claim 1 in which the internal periphery of said clutch member has a plurality of projections thereon defining between them grooves in which said stationary rolls are positioned, a pin on each projection, and said spring members each comprise a twisted coil spring having a coil portion mounted on said pin and having legs depending toward the shaft from the coil portion and engaged with the main movable rolls for urging them into contact with the stationary rolls and said shaft.

* * * * *